(12) United States Patent
Dolce

(10) Patent No.: US 11,533,961 B1
(45) Date of Patent: Dec. 27, 2022

(54) MULTI-FUNCTIONAL VEHICLE HELMET

(71) Applicant: Dominuse-Cain Dolce, Miami, FL (US)

(72) Inventor: Dominuse-Cain Dolce, Miami, FL (US)

( * ) Notice: Subject to any disclaimer, the term of this patent is extended or adjusted under 35 U.S.C. 154(b) by 1116 days.

(21) Appl. No.: 16/035,015

(22) Filed: Jul. 13, 2018

(51) Int. Cl.
| | | |
|---|---|---|
| *H04B 7/00* | (2006.01) | |
| *A42B 3/04* | (2006.01) | |
| *A42B 3/30* | (2006.01) | |
| *G06F 1/16* | (2006.01) | |
| *H04B 1/3827* | (2015.01) | |
| *A42B 3/22* | (2006.01) | |

(52) U.S. Cl.
CPC ............ *A42B 3/0406* (2013.01); *A42B 3/306* (2013.01); *G06F 1/163* (2013.01); *H04B 1/385* (2013.01); *A42B 3/22* (2013.01)

(58) Field of Classification Search
CPC ....... A42B 3/0406; A42B 3/306; G06F 1/163; H04M 1/0264; H04M 1/0274; H04M 1/7253; H04B 1/38; H04B 1/385; H04B 2001/3872
See application file for complete search history.

(56) References Cited

U.S. PATENT DOCUMENTS

| | | | |
|---|---|---|---|
| 5,006,072 A | 4/1991 | Letovsky et al. | |
| 5,091,719 A | 2/1992 | Beamon, III | |
| 5,420,828 A | 5/1995 | Geiger | |
| 5,453,877 A | 9/1995 | Gerbe et al. | |
| 5,537,092 A | 7/1996 | Suzuki et al. | |
| 6,058,515 A * | 5/2000 | Kitahara | A42B 3/128 |
| | | | 2/412 |
| 6,798,392 B2 | 9/2004 | Hartwell et al. | |
| 6,859,327 B2 | 2/2005 | Del Bianco et al. | |
| 6,978,162 B2 | 12/2005 | Russell et al. | |
| 7,519,405 B1 * | 4/2009 | Brent | A42B 3/30 |
| | | | 340/539.18 |
| 8,692,886 B2 | 4/2014 | Ennis | |
| 8,810,482 B2 | 8/2014 | Abdollahi et al. | |
| 9,060,221 B1 | 6/2015 | Kaplan | |
| 9,247,779 B1 * | 2/2016 | Aloumanis | G08G 1/167 |
| 9,389,677 B2 * | 7/2016 | Hobby | H04N 7/185 |
| 9,414,634 B2 | 8/2016 | Gindin | |
| 9,451,802 B2 | 9/2016 | Shearman et al. | |
| 2006/0293797 A1 * | 12/2006 | Weiler | A01G 25/165 |
| | | | 700/16 |
| 2008/0239080 A1 | 10/2008 | Moscato | |
| 2010/0095439 A1 * | 4/2010 | Nolan | A42B 3/286 |
| | | | 2/15 |
| 2011/0281652 A1 * | 11/2011 | Laverdiere | G06F 3/0219 |
| | | | 345/173 |

(Continued)

*Primary Examiner* — Tuan Pham
(74) *Attorney, Agent, or Firm* — Albert Bordas, Esq.

(57) ABSTRACT

A multi-functional vehicle helmet, having a helmet assembly with an exterior shell and an interior shell having protective foam in between. The exterior shell has a transceiver for wireless communications embedded therein. Further having an audio video interleave recording device, and a multifunctional knob assembly having first and second multifunctional knobs, skipping buttons, and tracking buttons. Further having a microphone assembly, and a stereo speaker assembly with at least one speaker embedded in the interior shell. Further having a liquid crystal display, at least one secure digital expansion slot, and a battery assembly having a battery, wherein a multi-functional vehicle helmet is able to communicate with at least a second enabled device.

12 Claims, 3 Drawing Sheets

(56) References Cited

U.S. PATENT DOCUMENTS

| | | |
|---|---|---|
| 2013/0093585 A1 | 4/2013 | Ambani |
| 2013/0217370 A1 | 8/2013 | Rajhon et al. |
| 2013/0305437 A1 | 11/2013 | Weller et al. |
| 2014/0273863 A1 | 9/2014 | Luizzi |
| 2014/0362244 A1 | 12/2014 | Martin |
| 2018/0014597 A1* | 1/2018 | Cooke .................... A42B 3/303 |
| 2018/0188813 A1* | 7/2018 | Saez ....................... G06F 3/005 |
| 2018/0249087 A1* | 8/2018 | Arnold ................... A41D 1/002 |

* cited by examiner

MULTI-FUNCTIONAL VEHICLE HELMET

BACKGROUND OF THE INVENTION

1. Field of the Invention

The present invention relates to helmets, and more particularly, to multi-functional helmets.

2. Description of the Related Art

Applicant believes that one of the closest references corresponds to U.S. Pat. No. 5,006,072 issued to Letovsky, et al. on Apr. 9, 1991 for High performance motorcycle simulator and helmet display. However, it differs from the present invention because Letovsky, et al. teach a motorcycle simulator, which is capable of providing six degrees of movement freedom to realistically simulate the sensory cues experienced while operating a high performance motorcycle. A helmet mounted video display system is also provided which provides a wide field of view image to enhance the simulator sensory cues.

Applicant believes that another reference corresponds to U.S. Pat. No. 5,091,719 issued to William S. Beamon III on Feb. 25, 1992 for Helmet display. However, it differs from the present invention because Beamon III teaches a helmet mountable display system that displays a raster scanned image to each eye of a wearer of the helmet for presenting a stereoscopic image. The system includes a first and second lens having a respective optical axis and first and second oscillatable deflecting surfaces for generating the raster. The lenses may be arranged so that the optical axes from a V with the first and second deflecting surfaces disposed substantially at the apex of the V. This arrangement may be bilaterally symmetrical such that a plurality of light rays for forming a first image passes through the first lens along one optical path, strikes the first deflecting surface, is directed onto the second deflecting surface, and is directed through the second lens toward a focal plane where a real image is available to be supplied to one eye. Another plurality of light rays for forming a second image passes through the second lens along another optical path generally opposite to the one optical path, strikes the first deflecting surface, is directed onto the second deflecting surface and is directed through the first lens toward a focal plane where another real image is available to be supplied to the other eye. The real images are raster scanned when the first and second surfaces are oscillating in a predetermined pattern. Each light ray supplies information to a corresponding zone of the image.

Applicant believes that another reference corresponds to U.S. Pat. No. 5,420,828 issued to Michael B. Geiger on May 30, 1995 for Viewing screen assembly. However, it differs from the present invention because Geiger teaches a viewing screen apparatus for helmets or face masks of the type having a viewing area covered by a face plate. The apparatus includes an enclosure adapted to be mounted on a helmet or face mask adjacent the face plate, a solid-state flat panel display screen and associated circuitry contained within the sealed enclosure for displaying visual images on the screen responsive to electronic signals, and a signal receiver connected with the screen for enabling the screen to receive electronic signals from an electronic signal transmission source. In one embodiment the enclosure is selectively movable between a viewing position adjacent the face plate and a position out of the wearer's field of vision to allow an unobstructed field of vision through the face plate. In another embodiment, the apparatus includes an imaging device adapted to be connected to the helmet or face mask for transmitting electronic signals selected from the group consisting of analog, digital, television, and laser imaging signals to a remote location. The apparatus may be incorporated into various types of helmets and face masks such as underwater diver's helmets and masks, space suit helmets, fire fighters helmets and masks, and allows the wearer to view drawings, text and other information transmitted from a remote source while carrying out tasks in an adverse environment and also allows two way visual communication between two or more persons wearing helmets or masks equipped with the viewing system.

Applicant believes that another reference corresponds to U.S. Pat. No. 5,453,877 issued to Gerbe, et al. on Sep. 26, 1995 for Optical system of collimation notably for helmet display unit. However, it differs from the present invention because Gerbe, et al. teach a system designed to be mounted in an air pilot's helmet. It uses a confocal assembly with a first parabolic mirror and a second parabolic mirror, placed downline of a collimation objective, which gives a collimated radiation. The first mirror is totally reflective and the second mirror is semi-transparent to simultaneously transmit, by reflection, the collimated radiation and, by transparency, for example the view of the external landscape. These two mirrors are integrated into the ends of a plate with two parallel faces. The collimated radiation penetrates the plate by one of the parallel faces, gets reflected on the first mirror, undergoes a succession of total reflections on the parallel faces and then gets reflected on the second mirror before leaving the plate, still doing so through one of the two faces.

Applicant believes that another reference corresponds to U.S. Pat. No. 5,537,092 issued to Suzuki, et al. on Jul. 16, 1996 for Helmet display including an information display horizontally aligned in a space relation along a curvature of a helmet jaw. However, it differs from the present invention because Suzuki, et al. teach a helmet display for displaying information to a user thereof while the user is riding, for example, a motorcycle. A display mounted on a helmet includes a plurality of display elements horizontally aligned in a spaced relation along the curvature of the jaw of the helmet. A reflector reflects the images of the display elements into the eyes of a user wearing the helmet. The images of the display elements form as a whole information to the user. The reflector may be a reflective surface provided at a lower portion on the shield of the helmet. The reflector may be mounted on the upper portion of the jaw and the reflective surface thereof may have a curvature substantially the same as that of the jaw of the helmet.

Applicant believes that another reference corresponds to U.S. Pat. No. 6,798,392 issued to Hartwell, et al. on Sep. 28, 2004 for Smart helmet. However, it differs from the present invention because Hartwell, et al. teach a smart helmet including integrated electronics for providing safety and convenience features. Helmet features include a global locating system, an environmental interaction sensor, a mobile communications network device, a small display panel, a microphone and at least one speaker. The helmet is aware of the user's location and interactions with the environment. The helmet can provide data to a user, monitor the user's actions and condition, and send information to others about user's location and condition.

Applicant believes that another reference corresponds to U.S. Pat. No. 6,859,327 issued to Del Bianco, et al. on Feb. 22, 2005 for Device for displaying images that are recorded by means of a camera. However, it differs from the present invention because Del Bianco, et al. teach equipment especially for firemen, in the form of helmets and/or breathing masks with a display unit for infrared images. A mask for displaying images on a display is provided, whereby a camera records the images. The mask comprises a frame having a seal that, when the mask is used, rests on an assigned bearing surface, e.g. the visor of a breathing mask, in such a way that a sealed chamber is formed between the mask and the bearing surface.

Applicant believes that another reference corresponds to U.S. Pat. No. 6,978,162 issued to Russell, et al. on Dec. 20, 2005 for Integrated portable entertainment information and communication linked to a wireless helmet. However, it differs from the present invention because Russell, et al. teach a portable entertainment system for use with a vehicle, such as a bicycle or motorcycle, and a helmet. The system may include a vehicle subsystem and a helmet subsystem. The vehicle subsystem includes a mounting device having at least one port, the mounting device adapted to connect to the bicycle, and a portable computing device positionable in the at least one port, the portable computing device having one or more digitized audio files thereon. A wireless transmitter is coupled with the portable computing device, the wireless transmitter transmitting a digitized audio signal when the portable computing device is playing a digitized audio file. The helmet subsystem includes a wireless receiver positioned on the helmet, the wireless receiver receiving the digitized audio signal from the wireless transmitter; a processor coupled with the wireless receiver, the processor converting the digitized audio signal to an analog audio signal; and speaker ear cones positioned on the helmet, the speaker ear cones connected with the processor for creating an audible audio signal from the analog audio signal. The speaker ear cones are positioned on the helmet near the user's ears without the speaker ear cones contacting the user's ears. In this manner, the user can hear traffic sounds, as needed for safety reasons, and the user can operate the vehicle without having wires interfering with the operation of the vehicle.

Applicant believes that another reference corresponds to U.S. Pat. No. 8,692,886 issued to Timothy James Ennis on Apr. 8, 2014 for Multidirectional video capture assembly. However, it differs from the present invention because Ennis teaches a multidirectional video capture assembly that can include a multidirectional helmet camera with protective housing and plurality of image sensors. The image sensors may be oriented in a plurality of directions for simultaneous capture of image data. A multi channel flexible cable can emerge from the protective housing, the cable adapted to carry image signals from the image sensors to an image recording and/or image display device. The protective housing may also be equipped with a complimentary equipment cavity for inclusion of additional advantageous equipment, as may be included to suit individual circumstances.

Applicant believes that another reference corresponds to U.S. Pat. No. 8,810,482 issued to Abdollahi, et al. on Aug. 19, 2014 for Modular heads-up display systems. However, it differs from the present invention because Abdollahi, et al. teach a Heads-Up Display (HUD) system that has a processor, a power source, and one or more sensors coupled to a frame connector. The processor is configured to receive signals from the one or more sensors and output image data. A display is mounted on a display arm extending from the frame connector. The display is configured to display images based on the image data. A goggles frame is configured to releasably receive the frame connector. The display is located within a field of view of a user wearing the goggles frame when the goggles frame receives the frame connector.

Applicant believes that another reference corresponds to U.S. Pat. No. 9,060,221 issued to Ari A. Kaplan on Jun. 16, 2015 for Safety helmet with speaker assembly. However, it differs from the present invention because Kaplan teaches a safety helmet having a protective shell head covering and a front edge, a rear edge, and first and second lateral edges. A speaker assembly has at least one speaker mounted onto the helmet and aimed outwardly therefrom. The speaker assembly has means to receive audio signals from a portable sound signal-producing device. The at least one speaker mounted onto the helmet and aimed outwardly therefrom emanates sound directed approximately perpendicularly from the protective shell head covering without blocking surrounding sound, and without affecting safety aspects of the helmet.

Applicant believes that another reference corresponds to U.S. Pat. No. 9,247,779 issued to Aloumanis, et al. on Feb. 2, 2016 for Enhanced global positioning system (gps) based functionality for helmets. However, it differs from the present invention because Aloumanis, et al. teach a motorcycle helmet that includes electronic components operating within the motorcycle helmet. At least a portion of the electronic components is embedded within an outer shell of the helmet or an inner shell of the helmet. The electronic components include an internally mounted Global Positioning System (GPS) transceiver that is part of a GPS subsystem of the electronic components.

Applicant believes that another reference corresponds to U.S. Pat. No. 9,414,634 issued to Jeffrey L. Gindin on Aug. 16, 2016 for Camera equipped helmet. However, it differs from the present invention because Gindin teaches a method and an article of manufacture configured to allow viewing of scenes not directly in the field of view of the viewer. In various embodiments, a helmet is equipped with a video camera, facing in a direction other than the direction of view of the user of the helmet, and a display visible to the user to display the images captured by the video camera. The helmet may be used while riding a bicycle, a motorcycle, a horse, while walking, and the like. In some embodiments, the video camera transmits data wirelessly and the direction of its view is adjustable. In some embodiments, a storage device is integrated in the helmet to allow recording of the images and sounds captured by the video camera for future download to another recording medium or a computing device.

Applicant believes that another reference corresponds to U.S. Pat. No. 9,451,802 issued to Shearman, et al. on Sep. 27, 2016 for Helmet system and methods. However, it differs from the present invention because Shearman, et al. teach a variation of a method for recording accidents that includes: in a first mode, capturing a second video frame at a second time, storing the second video frame with a first sequence of video frames, captured over a buffer duration, in local memory in the helmet, removing a first video frame captured outside of the buffer duration from local memory, and rendering a sub region of the second video frame on a display arranged within the helmet; in response to detection of an accident involving the helmet, transitioning from the first mode into a second mode; in the second mode, capturing a second sequence of video frames, and storing the second sequence of video frames exceeding the buffer duration in local memory; and generating a video file from the first sequence of video frames and the second sequence of video frames stored in local memory.

Applicant believes that another reference corresponds to U.S. Patent Application Publication No. 2008/0239080, published on Oct. 2, 2008 to Jonathan D. Moscato for Head-mounted rear vision system. However, it differs from the present invention because Moscato teaches a rear vision system to allow a bicycle, motorcycle rider, or an operator of any vehicle to safely and check the rear view without requiring the rider's head to be in a predetermined position. The system is comprised of a video camera which is mounted to a vehicle and facing its rear view and a head-mounted display which is connected to the video camera's output video signal. The head-mounted display is worn on the rider's head and allows the rider to see his rear view by simply glancing at the digital image, which is projected from the head-mounted display.

Applicant believes that another reference corresponds to U.S. Patent Application Publication No. 2013/0093585 A1, published on Apr. 18, 2013 to Amar Vimal Ambani for motorcycle helmet with electronic safety features. However, it differs from the present invention because Ambani teaches a system for enhancing the safety and functionality of a motorcycle or bicycle type helmet that includes built-in turn and brake indicators, a transceiver for wireless communications with a corresponding transceiver mounted on a motorcycle, bicycle, or other vehicle, and a speaker and a microphone. The speaker and microphone permits two-way audio communications between the wearer of the helmet and others, either through a cellular network or through a wireless connection to the helmet of a passenger of the vehicle, and further permits such enhanced features as transmission of voice instructions to a navigation system and reception/playback of responsive navigation information, playback from a music system, and audio feedback that the turn signals are being operated, as well as anti-theft protection.

Applicant believes that another reference corresponds to U.S. Patent Application Publication No. 2013/0217370, published on Aug. 22, 2013 to Rajhon, et al. for Protective helmet with voice-activated telephonic and route-guidance systems. However, it differs from the present invention because Rajhon, et al. teach a protective helmet that uses Bluetooth technology to integrate components of a hands-free, voice-activated telephonic communication system, and a hands-free voice-activated route guidance system. The Bluetooth transceiver provides the hub through which communications among the various components of the telephonic and route guidance systems take place. Incoming calls can be screened based on audible caller-IDs and outgoing calls placed based on spoken identifiers. In response to a spoken destination name, audible turn-by-turn route instructions are generated.

Applicant believes that another reference corresponds to U.S. Patent Application Publication No. 2013/0305437, published on Nov. 21, 2013 to Weller, et al. for Augmented reality motorcycle helmet. However, it differs from the present invention because Weller, et al. teach an augmented-reality helmet, which has a full-face motorcycle helmet with a lookdown micro-display that projects a virtual image in-line with the helmet's chin bar. In order to accommodate the power requirements, the helmet includes a battery pack mounted at the base of the motorcyclist's skull. A wind turbine charges the batteries. Exhaust from the turbine is then deducted through the helmet to cool the battery pack and/or the motorcyclist's head. The turbine is controllable so that it can operate as a circulating fan to provide ventilation. A digital gyroscope provides a control input to a controller for operating a steerable headlight of the motorcycle to track the rider's head movements; and provides acceleration output to an algorithm that will contact emergency responders if the rider is non-responsive after a collision. A 170-degree rear-view camera is mounted within an aerodynamic fairing on the back of the helmet.

Applicant believes that another reference corresponds to U.S. Patent Application Publication No. 2014/0273863, published on Sep. 18, 2014 to Bryant Luizzi for Smart helmet with mobile communicator integration. However, it differs from the present invention because Luizzi teaches a protective helmet that includes a protective outer shell, a head cavity, and a computer processor housed within the protective helmet. A transmitter and a receiver located in the protective helmet that is configured to establish a communication with a mobile communicator. A microphone connected to the computer processor and located in a mouth region of the head cavity, the microphone configured to convert sound to an electronic transmission and provide the electronic transmission to the computer processor. Additionally, at least one speaker connected to the computer processor and located in an ear region of the head cavity. The computer processor is configured to receive verbal instructions from the microphone. The instructions are configured to control the mobile communicator. Moreover, the computer processor is configured to receive information from the mobile communicator and provide this information to the speakers in the form of an audio transmission.

Applicant believes that another reference corresponds to U.S. Patent Application Publication No. 2014/0362244, published on Dec. 11, 2014 to Anthony Martin for Helmet camera system. However, it differs from the present invention because Martin teaches a portable video capture device configured to be securely mounted within a conventional sports helmet. The camera is mounted within the front of the frame of the helmet. The components of the camera, including a power source, a lens, a wireless transmitter and an antenna, are configured to be safely housed within the frame of the helmet between the foam padding and the outer housing of the helmet. The transmitting antenna is designed to transmit a video feed via, the wireless transmitter from the camera to a receiver on a static, user-defined frequency, so that multiple iterations may be utilized simultaneously on the same playing field.

Other patents describing the closest subject matter provide for a number of more or less complicated features that fail to solve the problem in an efficient and economical way. None of these patents suggest the novel features of the present invention.

SUMMARY OF THE INVENTION

The present invention is a multi-functional vehicle helmet, comprising a helmet assembly comprising an exterior shell and an interior shell having protective foam in between. The exterior shell comprises a transceiver for wireless communications embedded therein. Further comprising an audio video interleave recording device, and a multifunctional knob assembly comprising first and second multifunctional knobs, skipping buttons, and tracking buttons. Further comprising a microphone assembly, and a stereo speaker assembly having at least one speaker embedded in the interior shell. Further comprising a liquid crystal display, at least one secure digital expansion slot, and a battery assembly having a battery, wherein a multi-functional vehicle helmet is able to communicate with any "BLUETOOTH" enabled device including, but not limited to: mobile phones, computers, GPS, MP3 players, and other electronic devices. "BLUETOOTH" defining a standard for short-range wireless interconnection of mobile phones, computers, and other electronic devices.

The helmet assembly comprises a front face, a bottom edge, a rear face, and lateral sides. The front face comprises a visor, and slots positioned a predetermined distance from the bottom edge. The exterior shell comprises a composite exterior coating to protect the transceiver from weather-related elements comprising sunrays, rain, sleet, snow, and/or wind.

The transceiver provides multipoint connectivity, pairing with other electronic devices, and comprises digital signal processors for noise reduction and echo cancellation. The audio video interleave recording device comprises expandable storage and is embedded into the front face. The audio video interleave recording device comprises an audio video interleave recording device lens that flush with the front face approximately centered above the visor.

The first and second multifunctional knobs, the skipping buttons, and the tracking buttons extend from a lateral side of the exterior shell, close to the bottom edge. The first multifunctional knob is actuated for powering, volume, and redial. The second multifunctional knob is actuated for starting and stopping audio video interleave recording. The skipping buttons and the tracking buttons are actuated to skip or track recordings respectively. The multifunctional knob assembly is waterproof.

The microphone assembly comprises an external microphone and an internal microphone. The external microphone is connected to the audio video interleave recording device and is externally positioned centered above the visor. The internal microphone sends transmissions from the multi-functional vehicle helmet to enabled devices comprising a standard for short-range wireless interconnection including, but not limited to: mobile phones, computers, GPS, MP3 players, and other electronic devices.

The liquid crystal display is integrated and recessed on a front face edge, substantially adjacent to a lower portion of the visor, and works either with the visor in an up or down configuration. The liquid crystal display displays incoming calls, life of the battery, and connected electronic devices. The battery assembly further comprises a charging port and electrical wires. The electrical wires are internally positioned on both the lateral sides and connects the transceiver, the audio video interleave recording device, the at least one speaker, and the internal microphone to the battery.

It is therefore one of the main objects of the present invention to provide a multi-functional vehicle helmet.

It is another object of this invention to provide a multi-functional vehicle helmet, which is able to communicate with other enabled devices.

It is another object of this invention to provide a multi-functional vehicle helmet, which has a transceiver.

It is another object of this invention to provide a multi-functional vehicle helmet, which has an audio video recording device.

It is another object of this invention to provide a multi-functional vehicle helmet that is volumetrically efficient for carrying, transporting, and storage.

It is another object of this invention to provide a multi-functional vehicle helmet, which is of a durable and reliable construction.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Figure 1:
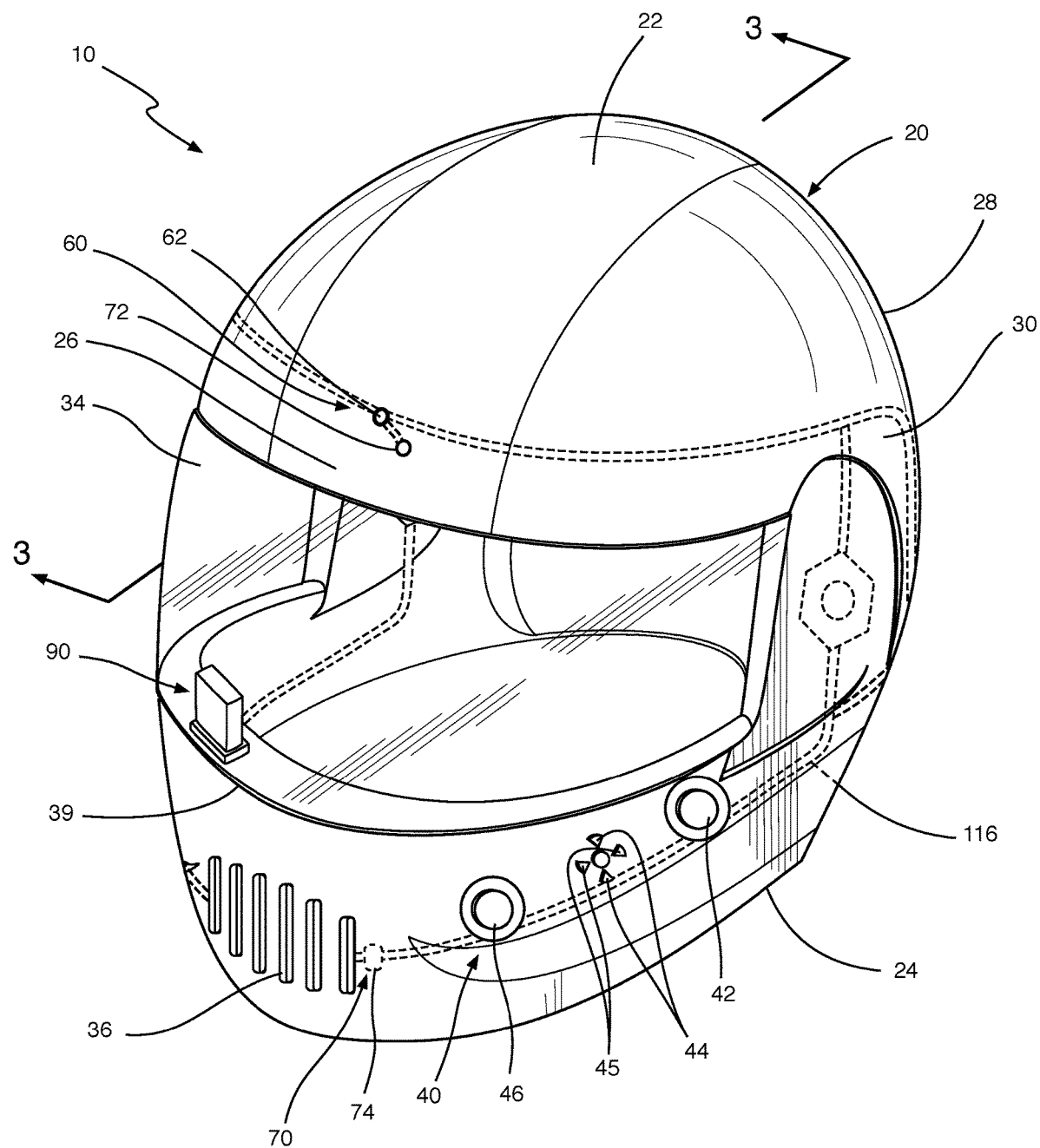
FIG. 1 is an isometric view of the present invention.

Referring now to the drawings, the present invention is a multi-functional vehicle helmet, and is generally referred to with numeral 10. It can be observed that it basically includes helmet assembly 20 comprising multifunctional knob assembly 40, transceiver 50 for wireless communications, audio video interleave (AVI) recording device 60, microphone assembly 70, stereo speaker assembly 80, liquid crystal display 90, secure digital expansion slot 100, and battery assembly 110.

As seen in FIG. 1, helmet assembly 20 comprises exterior shell 22, bottom edge 24, front face 26, rear face 28, and lateral sides 30. Front face 26 comprises visor 34 and slots 36. In a preferred embodiment, slots 36 are positioned on front face 26 approximately centered and close to bottom edge 24.

AVI recording device 60 is embedded into front face 26 and comprises audio video interleave recording device lens 62. AVI recording device lens 62 is flush with front face 26 and approximately centered above visor 34.

Figure 2:
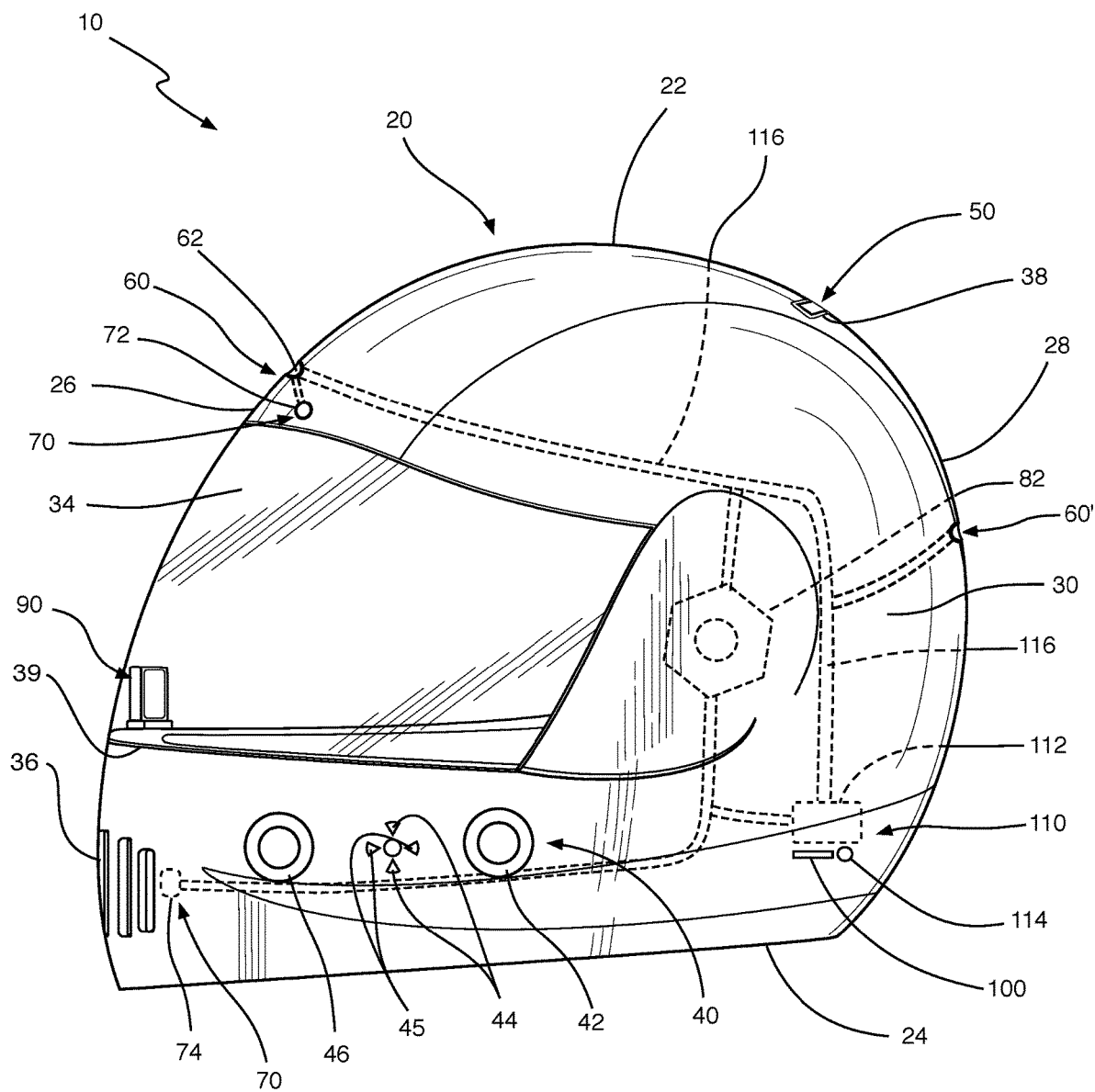
FIG. 2 is a side view of the present invention.

As seen in FIG. 2, multifunctional knob assembly 40 comprises first multifunctional knob 42, second multifunctional knob 46, skipping buttons 44, and tracking buttons 45 that extend from exterior shell 22. In a preferred embodiment, first multifunctional knob 42, second multifunctional knob 46, skipping buttons 44, and tracking buttons 45 are positioned on a left side of exterior shell 22 and close to bottom edge 24.

First multifunctional knob 42 is actuated for powering, volume, and redial, whereby powering is activated by pressing multifunctional knob 42 for a first predetermined period, volume is adjusted by rotating multifunctional knob 42, and redial is activated by pressing multifunctional knob 42 for a second predetermined period, which is shorter than the first predetermined period.

Second multifunctional knob 46 is actuated for starting and stopping audio video interleave (AVI) recording. Skipping buttons 44 allow to skip up or down one or more recordings as desired, and tracking buttons 45 allow to track backward or forward the recording. Multifunctional knob assembly 40 is waterproof.

Microphone assembly 70 comprises external microphone 72 and internal microphone 74. External microphone 72 is connected to AVI recording device 62 and is externally positioned centered above visor 34. Internal microphone 74 sends transmissions from a multi-functional vehicle helmet 10 to enabled devices comprising a standard for short-range wireless interconnection including, but not limited to: mobile phones, computers, GPS, MP3 players, and other electronic devices, whereby the multi-functional vehicle helmet 10 is able to communicate via transceiver 50. Internal microphone 74 also sends transmissions for phone calls.

Present invention 10 further comprises at least one secure digital (SD) expansion slot 100. SD expansion slot 100 allows for inserting an expansion card or circuit board to provide extra facilities and memory.

Battery assembly 110 comprises battery 112, charging port 114, and electrical wires 116. Electrical wires 116 are internally positioned on both lateral sides 30 and connect transceiver 50, AVI recording device 60, at least one speaker 82, and internal microphone 74 to battery 112. In a preferred embodiment, SD expansion slot 100, battery 112, and charging port 114 are positioned on the left side of helmet assembly 20 or centered on rear face 28.

Figure 3:
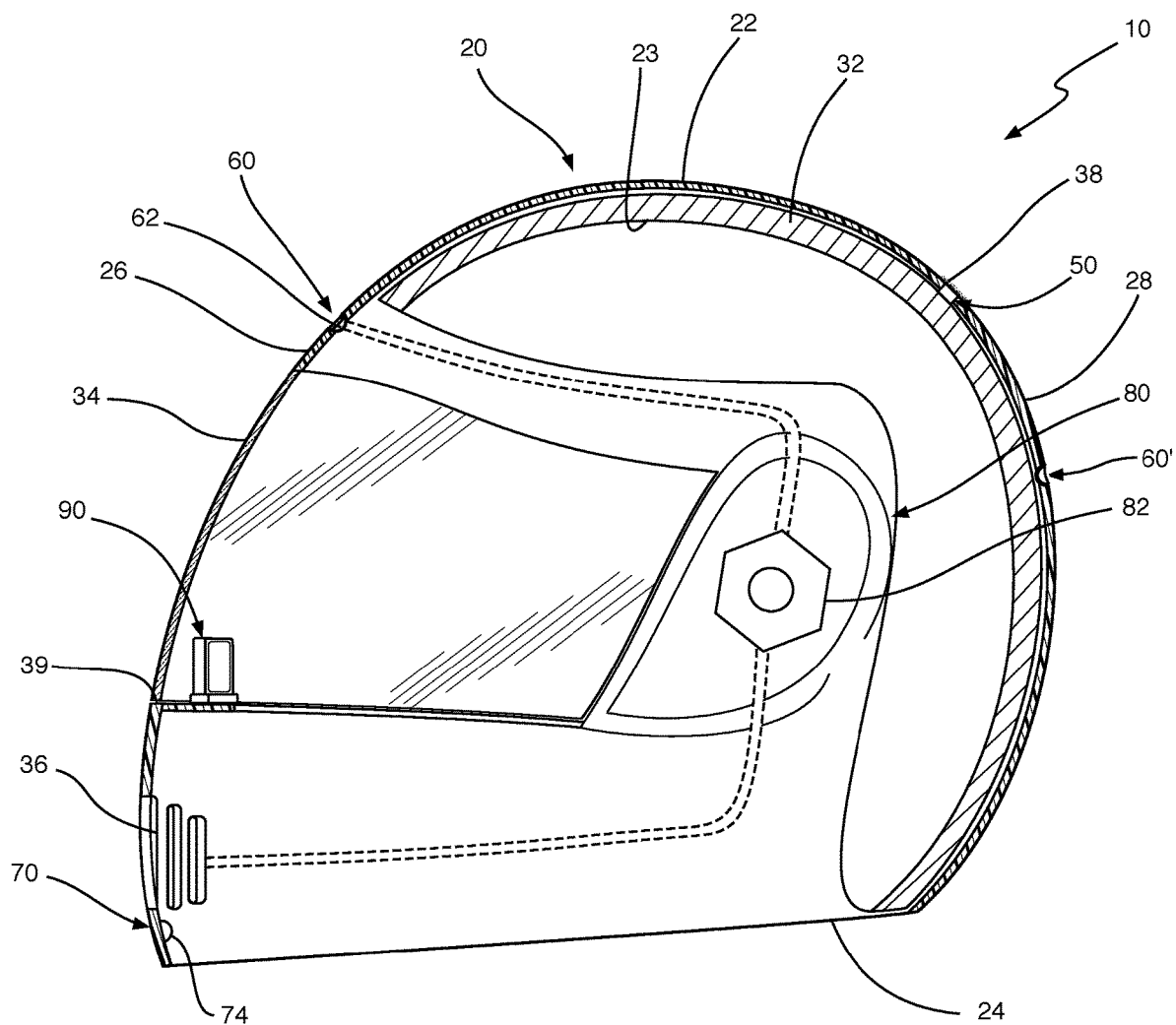
FIG. 3 is a cut view taken along the lines 3 - 3 as seen in FIG. 1.

As seen in FIG. 3, exterior shell 22 and interior shell 23 have protective foam 32 in between. Transceiver 50 is embedded into exterior shell 22. In a preferred embodiment, exterior shell 22 is a polycarbonate shell and comprises composite exterior coating 38 to protect transceiver 50 from weather-related elements such as, but not limited to: sunrays, rain, sleet, snow, and/or wind. Transceiver 50 provides multipoint connectivity, and comprises digital signal processors (DSP) to noise reduction and echo cancellation. Stereo speaker assembly 80 is embedded, and in a preferred embodiment, is flush with interior shell 23 and comprises at least one speaker 82.

Liquid crystal display (LCD) 90 is integrated and recessed on front face edge 39, substantially adjacent to a lower portion of visor 34. LCD 90 works either with visor 34 in an up or down configuration. LCD 90 displays incoming calls, life of battery 112, seen in FIG. 2, and connected electronic devices. In a preferred embodiment, LCD 90 displays as a scrolling marquee, laterally or horizontally in orientation. In a preferred embodiment, present invention 10 further comprises rear-facing AVI recording device 60'.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A multi-functional vehicle helmet, comprising:
   A) a helmet assembly comprising an exterior shell and an interior shell having a protective foam in between, wherein said exterior shell comprises a transceiver for wireless communications embedded therein, said exterior shell comprises a composite exterior coating to protect said transceiver from weather-related elements comprising sunrays, rain, sleet, snow, or wind, said helmet assembly further comprises a front face, a bottom edge, a rear face, and lateral sides, said front face comprises a visor, and slots positioned a predetermined distance from said bottom edge;
   B) an audio video interleave recording device;
   C) a multifunctional knob assembly comprising first and second multifunctional knobs, skipping buttons, and tracking buttons, said first and second multifunctional knobs, said skipping buttons, and said tracking buttons extend from a said lateral side of said exterior shell, close to said bottom edge, said first multifunctional knob is actuated for powering, volume, and redial, whereby powering is activated by pressing said multifunctional knob for a first predetermined period, volume is adjusted by rotating said multifunctional knob, and redial is activated by pressing said multifunctional knob for a second predetermined period, which is shorter than said first predetermined period;
   D) a microphone assembly comprising an external microphone and an internal microphone;
   E) a stereo speaker assembly having at least one speaker embedded in said interior shell;
   F) a liquid crystal display, said liquid crystal display is integrated and recessed on a front face edge, substantially adjacent to a lower portion of said visor, and works either with said visor in an up or down configuration;
   G) at least one secure digital expansion slot; and
   H) a battery assembly having a battery, wherein a multi-functional vehicle helmet is able to communicate with at least an enabled device comprising a standard for short-range wireless interconnection, said internal microphone sends transmissions from said multi-functional vehicle helmet to said second enabled device and for phone calls.

2. The multi-functional vehicle helmet set forth in claim 1, further characterized in that said transceiver provides multipoint connectivity.

3. The multi-functional vehicle helmet set forth in claim 1, further characterized in that said transceiver comprises digital signal processors for noise reduction and echo cancellation.

4. The multi-functional vehicle helmet set forth in claim 1, further characterized in that said audio video interleave recording device comprises expandable storage and is embedded into said front face.

5. The multi-functional vehicle helmet set forth in claim 1, further characterized in that said audio video interleave recording device comprises an audio video interleave recording device lens that flush with said front face approximately centered above said visor.

6. The multi-functional vehicle helmet set forth in claim 1, further characterized in that said second multifunctional knob is actuated for starting and stopping audio video interleave recording.

7. The multi-functional vehicle helmet set forth in claim 1, further characterized in that said skipping buttons and said tracking buttons are actuated to skip or track recordings respectively.

8. The multi-functional vehicle helmet set forth in claim 1, further characterized in that said multifunctional knob assembly is waterproof.

9. The multi-functional vehicle helmet set forth in claim 1, further characterized in that said external microphone is connected to said audio video interleave recording device and is externally positioned centered above said visor.

10. The multi-functional vehicle helmet set forth in claim 1, further characterized in that said liquid crystal display displays incoming calls, life of said battery, and connected electronic devices.

11. The multi-functional vehicle helmet set forth in claim 1, further characterized in that said battery assembly further comprises a charging port and electrical wires.

12. The multi-functional vehicle helmet set forth in claim 11, further characterized in that said electrical wires are internally positioned on both said lateral sides and connects said transceiver, said audio video interleave recording device, said at least one speaker, and said internal microphone to said battery.

* * * * *